(12) United States Patent
Kikuchi

(10) Patent No.: US 7,595,821 B2
(45) Date of Patent: Sep. 29, 2009

(54) SOLID-STATE IMAGE PICKUP DEVICE AND CAMERA USING THE SAME

(75) Inventor: Shin Kikuchi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 961 days.

(21) Appl. No.: 11/130,175

(22) Filed: May 17, 2005

(65) Prior Publication Data

US 2005/0270392 A1    Dec. 8, 2005

(30) Foreign Application Priority Data

Jun. 2, 2004    (JP)    ............................. 2004-164636

(51) Int. Cl.
*H04N 5/235* (2006.01)
*H04N 3/14* (2006.01)

(52) U.S. Cl. ..................... 348/230.1; 348/300; 348/308

(58) Field of Classification Search ............. 348/220.1, 348/230.1, 294, 300, 308
See application file for complete search history.

(56) References Cited

U.S. PATENT DOCUMENTS

| | | | | |
|---|---|---|---|---|
| 4,603,354 | A | * | 7/1986 | Hashimoto et al. ....... 348/220.1 |
| 4,929,994 | A | | 5/1990 | Matsumoto ................... 357/30 |
| 5,867,045 | A | * | 2/1999 | Ueno et al. ............. 348/E3.018 |
| 6,037,577 | A | * | 3/2000 | Tanaka et al. ................ 348/302 |
| 6,061,093 | A | * | 5/2000 | Yonemoto ................... 348/300 |
| 6,661,451 | B1 | * | 12/2003 | Kijima et al. ............ 348/220.1 |
| 6,842,192 | B1 | * | 1/2005 | Suzuki et al. ............... 348/308 |
| 2002/0134918 | A1 | | 9/2002 | Miida |
| 2004/0080645 | A1 | * | 4/2004 | Shinohara ................... 348/301 |
| 2005/0185073 | A1 | * | 8/2005 | Watanabe ................... 348/294 |
| 2005/0259167 | A1 | | 11/2005 | Inoue et al. ................. 348/300 |
| 2005/0270392 | A1 | | 12/2005 | Kikuchi ...................... 348/308 |
| 2005/0270393 | A1 | | 12/2005 | Noda et al. ................. 348/308 |

FOREIGN PATENT DOCUMENTS

| | | |
|---|---|---|
| EP | 0 630 152 | 12/1994 |
| JP | 8-182005 | 7/1996 |

(Continued)

OTHER PUBLICATIONS

A. Yusa, et al., SIT Image Sensor: Design Considerations and Characteristics, IEEE Trans., vol. ED-33, No. 6, pp. 735-742, Jun. 1986.

(Continued)

*Primary Examiner*—Nhan T Tran
(74) *Attorney, Agent, or Firm*—Fitzpatrick, Cella, Harper & Scinto

(57) ABSTRACT

A solid-state image pickup device reduces the load of outputs from pixels and suppresses a decrease in gain, a reduction in a speed, and the like using a circuit for adding (averaging) a plurality of pixel signals. The device has a plurality of pixels which are one-dimensionally or two-dimensionally arranged and output photoelectrically converted signals, and a plurality of output lines to which the output signal(s) from one pixel or the pixels arranged on one column is/are outputted. A signal adder circuit for arbitrarily adding the output signals from the plurality of output lines and outputting an addition signal and a signal output circuit for outputting each of the output signals, as individual signals, from the plurality of output lines without adding them are independently provided.

12 Claims, 14 Drawing Sheets

FOREIGN PATENT DOCUMENTS

| | | |
|---|---|---|
| JP | 9-247535 | 9/1997 |
| JP | 2000-32345 | 1/2000 |
| JP | 2000-106653 | 4/2000 |
| JP | 2001-45382 | 2/2001 |
| JP | 2002-199284 | 7/2002 |

OTHER PUBLICATIONS

N. Tanaka, et al., "A 310K Pixel Bipolar Imager (BASIS)," IEEE Trans. Electron Devices, vol. 37, No. 4, pp. 964-971, Apr. 1990.

"AMI (Amplified MOS Intelligent Imager)", Magazines of the Japan Society of Television, vol. 41, No. 11, pp. 1075-1082 (Nov. 1987).

* cited by examiner

SOLID-STATE IMAGE PICKUP DEVICE AND CAMERA USING THE SAME

BACKGROUND OF THE INVENTION

1. Field of the Invention

The invention relates to a solid-state image pickup device having a one-dimensional or two-dimensional pixel signal adding means and a camera using such a solid-state image pickup device.

2. Related Background Art

Hitherto, as a method of adding pixel signals in a solid-state image pickup device, for example, there is a method disclosed in JP-A-2000-106653 as a Japanese Patent. FIG. 14 shows a conventional example showing a construction in which signals of 2-dimensional pixels are added by a (2H line memory+2H line adder) 206. A specific circuit construction of the signal adder circuit portion is shown in FIG. 15. For example, the pixel signals are outputted to output lines 108-1 and 108-2 and stored into capacitors C2-1, C3-1, and the like through MOS switches 123-1 and 126-1, after that, the MOS switches 123-1 and 126-1 are turned on, and an addition (average) output is obtained through a wiring 117-1.

As mentioned above, in the conventional example, input units of the pixel adding means are connected in common to the output line for executing a normal output (non-adding).

However, in such a construction of the common output line, the normal output burdens the signal lines more than in the case where there are no adding means, causing a delay of output time. The example of FIGS. 14 and 15 will be described hereinbelow. In the diagrams, the normal (non-adding) output is outputted to the wiring 117-1. In this instance, since there are MOS switches 123-1, 126-1, and 143-1 of the signal adder circuit, a floating capacitance is added. In JP-A-2000-106653, a value of the floating capacitance, which is added, increases with an increase in number of switches, the floating capacitance exercises a large influence in dependence on the degree of the addition, and the occurrence of a decrease in signal gain, a reduction in response speed, and the like is presumed.

SUMMARY OF THE INVENTION

It is an object of the invention to provide a solid-state image pickup device having a circuit for adding (averaging) a plurality of pixel signals, in which the loads of outputs from pixels can be reduced and a decrease in gain, a reduction in a speed, and the like can be suppressed.

To accomplish the above object, according to the invention, there is provided a solid-state image pickup device comprising: a plurality of pixels which are one-dimensionally or two-dimensionally arranged and output photoelectrically converted signals; a plurality of output lines to which the output signal(s) from one pixel or the plurality of pixels arranged on one column is/are outputted, respectively; a signal adder circuit which is connected to the plurality of output lines, respectively, and arbitrarily adds the output signals, and outputs an addition signal; and a signal output circuit for outputting each of the output signals without adding them, wherein the path of the output lines connected to the signal adder circuit and the path of the output lines connected to the signal output circuit are different.

In the invention, since the paths for sending the output signals from the pixel outputs to the signal adder circuits and the output circuit are made independent, the load of the output from the pixel can be reduced and the decrease in gain, the reduction in speed, and the like can be suppressed. Further, the timing for outputting the addition signal output and that for outputting the non-addition signal output (for example, an individual signal output) to the outside of the solid-state image pickup device can be separately controlled.

DETAILED DESCRIPTION OF THE PREFERRED EMBODIMENTS

Embodiments of the invention will be described in detail hereinbelow with reference to the drawings.

First Embodiment

Figure 1:
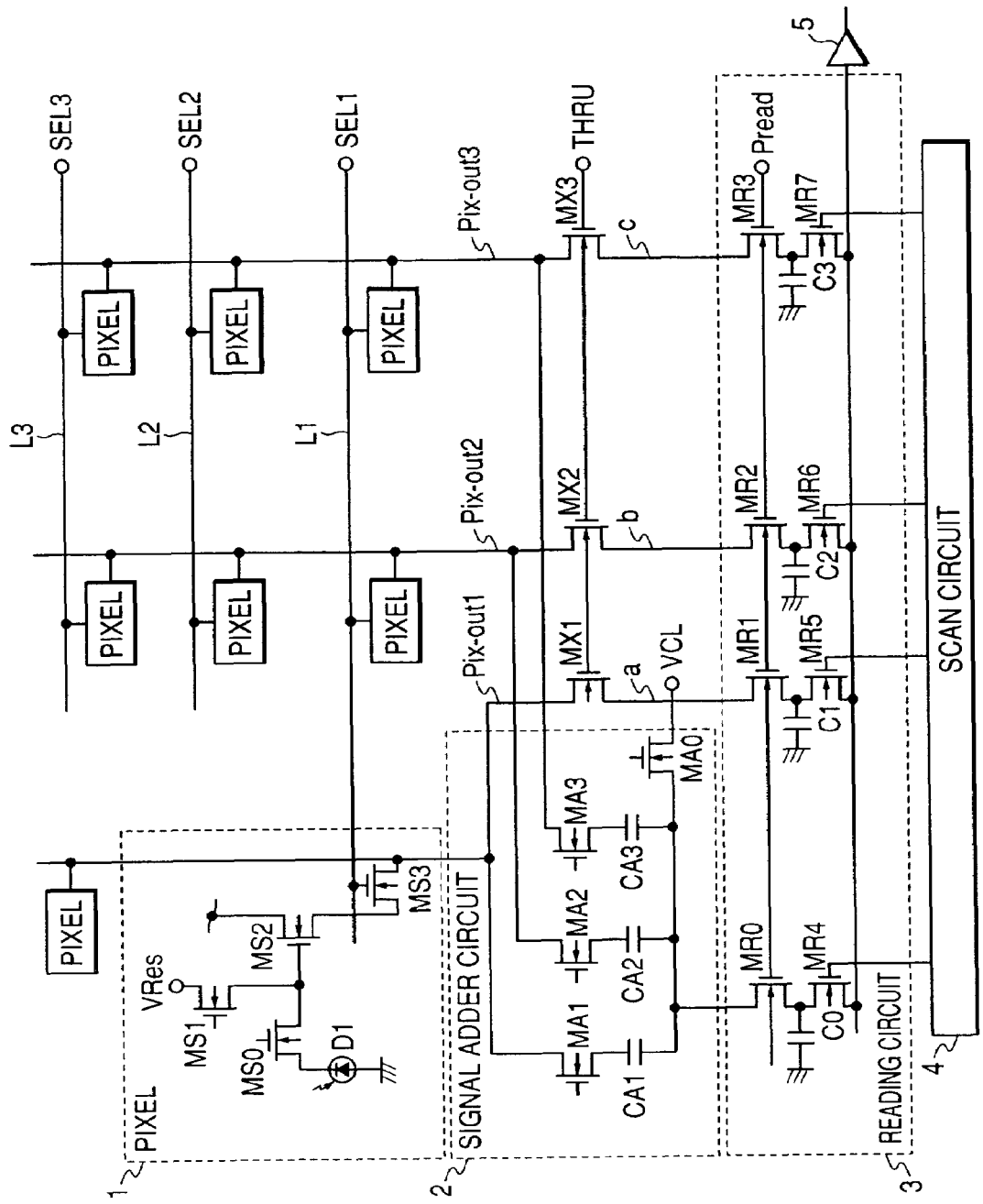
FIG. 1 is a circuit diagram showing a partial construction of a solid-state image pickup device according to the first embodiment of the invention.
Figure 10:
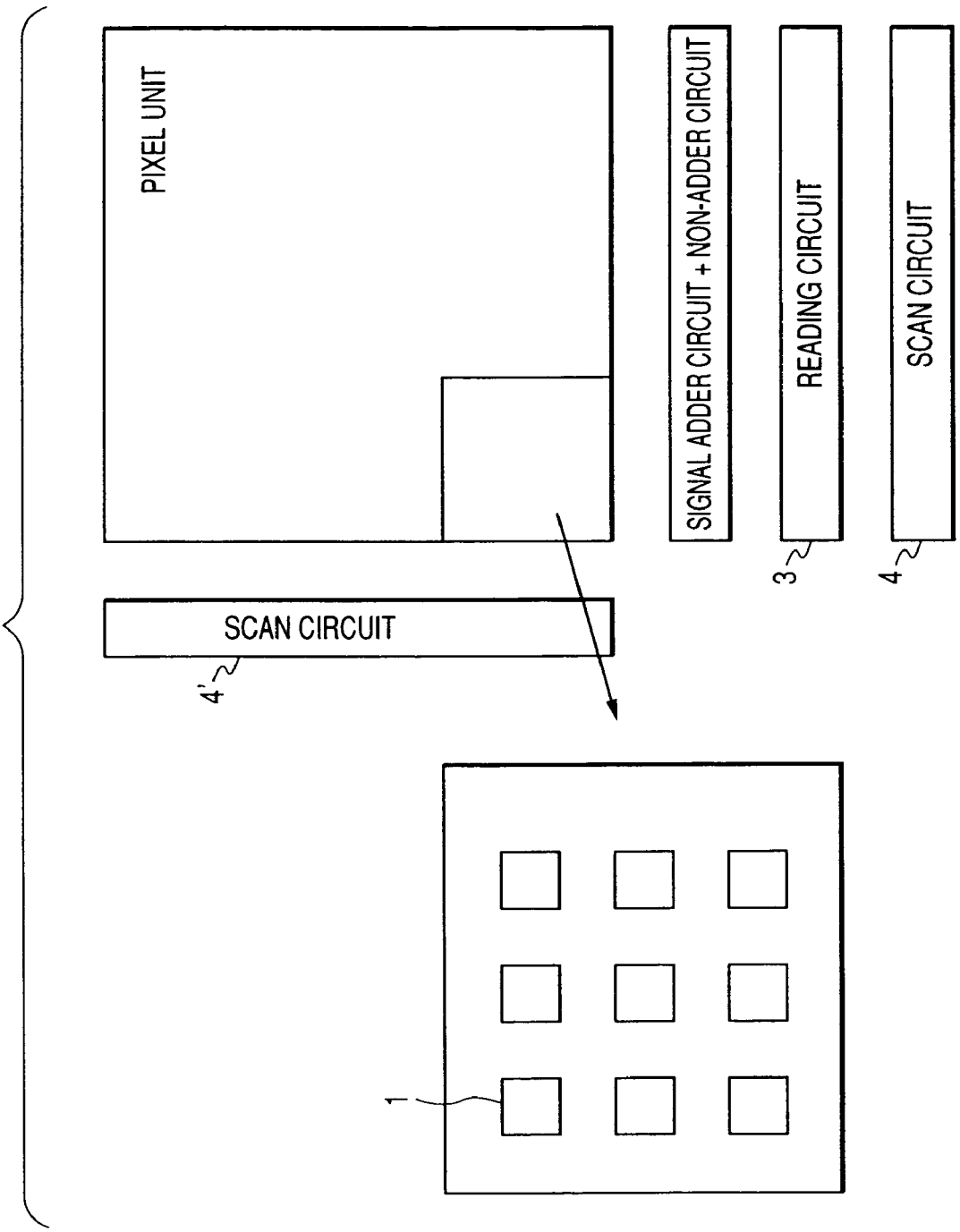
FIG. 10 is a block diagram showing a construction of the solid-state image pickup device according to the first embodiment of the invention.

FIG. 1 is a diagram showing the invention most preferably and is a circuit diagram showing a partial construction of a solid-state image pickup device of the first embodiment. The construction shown in FIG. 1 shows a partial region (a region constructed by pixels of a 3×3 matrix configuration) of a pixel unit of a solid-state image pickup device shown in FIG. 10 and a signal adder circuit+non-adder circuit (for example, an individual signal output circuit), a reading circuit, and a scan circuit of such a partial region. The solid-state image pickup device shown in FIG. 10 is constructed by: a plurality of pixel units in each of which pixels are two-dimensionally arranged; a scan circuit 4' for controlling a plurality of pixels in every row of the pixel unit; a signal adder circuit+non-adder circuit; a reading circuit 3; a scan circuit 4; and an output amplifier 5 (not shown).

Although the example in which the pixels are two-dimensionally arranged will be described in the embodiment and other embodiments, which will be explained hereinafter, naturally, the construction of each embodiment (excluding the third embodiment) can be also applied to an example where the pixels are one-dimensionally arranged. (In the case of one-dimensionally arranging the pixels, the performance of the apparatus is made as in the case where one pixel row is selected from the two-dimensionally arranged pixels).

Figure 7:
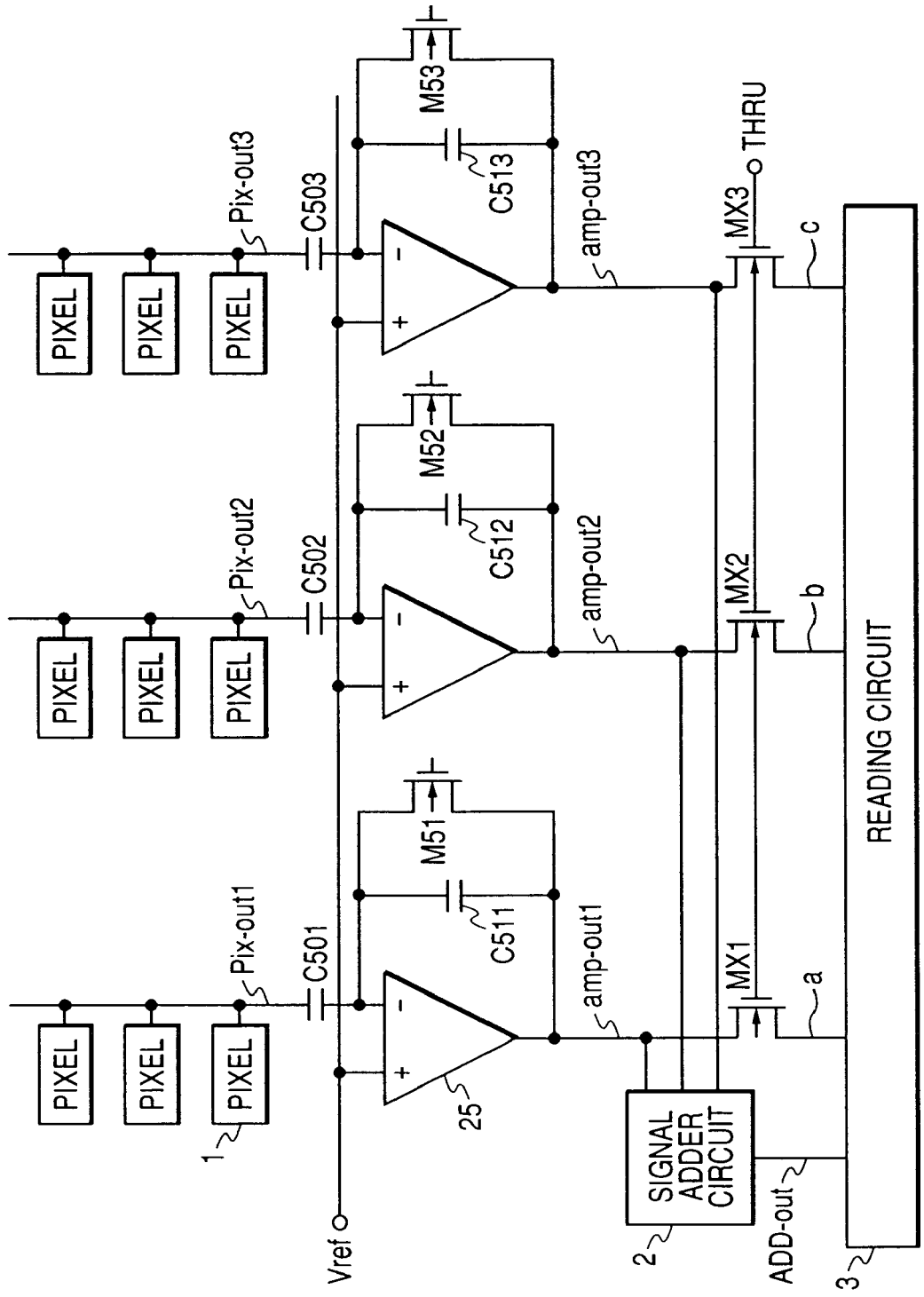
FIG. 7 is a circuit diagram showing another partial construction of a solid-state image pickup device according to the first embodiment of the invention.

Although not shown in FIG. 1, as shown in FIG. 7, the following component elements are connected to common output lines Pix⁻out1, Pix⁻out2, and Pix⁻out3, respectively: capacitors C501 to C503; operational amplifiers 25 in which the capacitors C501 to C503 are respectively connected to inverting input terminals (−) thereof and which operate as amplifiers whose gains exceed 1; capacitors C511 to C513 provided between the output terminals and the inverting input terminals of the operational amplifiers 25; and switch transistors M51 to M53 connected in parallel to the capacitors C511 to C513, respectively. A reference voltage (Vref) is applied to non-inverting input terminals (+) of the operational amplifiers 25, respectively. The capacitors C501 to C503, the operational amplifiers 25, the capacitors C511 to C513, and the switch transistors M51 to M53 are also omitted in the second to fourth embodiments, which will be explained hereinafter.

In FIG. 1, reference numeral 1 denotes a pixel. The pixel 1 is constructed by a photodiode D1 and MOS transistors MS0, MS1, MS2, and MS3. The MOS transistor MS0 is a transistor for sending charges from the photodiode D1 to a gate portion of the output transistor MS2 and its floating capacitor (FD). The MOS transistor MS1 is a switch transistor for resetting the FD portion. The MOS transistor MS3 is a switch transistor for outputting a signal obtained by the output transistor MS2 at a desired timing. The gates of the switch transistors MS3 of the pixels arranged in the horizontal direction are connected in common to signal lines L1 to L3 to which signals SEL1 to SEL3 are respectively supplied (the signals SEL1 to SEL3 are sequentially set to the high level by the scan circuit (not shown)). The sources of the switch transistors MS3 of the pixels arranged in the vertical direction are connected in common to the common output lines Pix⁻out1, Pix⁻out2, and Pix⁻out3, respectively. That is, when the signal SEL1 is set to the high level and the switch transistors MS3 connected to the signal line L1 are turned on, the outputs of the pixels connected to the signal line L1 are outputted to the common output lines Pix⁻out1, Pix⁻out2, and Pix⁻out3 through the switch transistors MS3. Although the pixels described here are called CMOS sensors, the pixels are not particularly limited to the CMOS sensor but the application of a VMIS (Threshold Voltage Modulation Image Sensor), a BCAST (Buried Charge Accumulator and Sensing Transistor array), an LBCAST (Lateral Buried Charge Accumulator and Sensing Transistor array), or the like is also possible. In particular, the application of the BCAST or LBCAST can be realized without an essential change by replacing the amplifying MOS transistor by a JFET transistor. A sensor of a type where the signal charges accumulated in a photoelectric conversion unit are transferred to a control electrode of the transistor equipped for the pixel and an amplified signal is outputted from a main electrode can be also used for the pixel in the embodiment. As an amplifying transistor, there can be mentioned: an SIT type image sensor using an SIT (A. Yusa, J. Nishizawa, et. al., "SIT image sensor: Design consideration and characteristics", IEEE trans. Vol. ED-33, pp. 735-742, June, 1986); a BASIS using a bipolar transistor (N. Tanaka et. al., "A 310K pixel bipolar imager (BASIS)", IEEE Trans. Electron Devices, vol. 37, pp. 964-971, April 1990); an AMI (Amplified MOS Intelligent Imager (Ando et al., "Amplified solid state image element AMI (Amplified MOS Intelligent Imager"), Magazines of The Japan Society of Television, 41, 11, pp. 1075-1082, November, 1987); or the like.

As shown in FIG. 7, the output signals of the pixels outputted to the common output lines Pix⁻out1, Pix⁻out2, and Pix⁻out3 are connected to the inverting input terminals (−) of the operational amplifiers 25 through the capacitors C501 to C503, respectively. Thus, they are amplified, outputted to output lines amp⁻out1, amp⁻out2, and amp⁻out3, and inputted to a signal adder circuit 2 and switch transistors MX1, MX2, and MX3, respectively. Their gains are determined by the capacitance ratio of the capacitors C501 and C511, the capacitance ratio of the capacitors C502 and C512, and the capacitance ratio of the capacitors C503 and C513.

Reference numeral 2 denotes the signal adder circuit. In the signal adder circuit 2, CA1, CA2, and CA3 denote capacitors for clamping the pixel signals on the common output lines Pix⁻out1, Pix⁻out2, and Pix⁻out3, respectively. One terminal of the clamp capacitor CA1 is connected to the common output line Pix⁻out1 through the switch transistor MA1. One terminal of the clamp capacitor CA2 is connected to the common output line Pix⁻out2 through the switch transistor MA2. One terminal of the clamp capacitor CA3 is connected to the common output line Pix⁻out3 through the switch transistor MA3 and the other terminals of the clamp capacitors CA1, CA2, and CA3 are connected in common to a switch transistor MR0 of the reading circuit 3, which will be explained hereinafter, and connected to a voltage source (electric potential is equal to VCL) (not shown) through a switch transistor MA0.

The other terminals (common terminals) of the clamp capacitors CA1, CA2, and CA3 are clamped to the electric potential VCL upon pixel resetting or FD resetting. After that, when the pixel signals are outputted, an addition (average) signal output of the common output lines Pix⁻out1, Pix⁻out2, and Pix⁻out3 appears at the common terminals by using the electric potential VCL as a reference. The switch transistors MA1, MA2, and MA3 are switches for separating or coupling the common output lines of the pixels and the clamp circuits. By properly controlling the switch transistors MA1, MA2, and MA3, it is possible to select one of the common output lines Pix⁻out1, Pix⁻out2, and Pix⁻out3 and add the output signals. For example, if the switch transistors MA1 and MA3 are turned on and the switch transistor MA2 is turned off, the addition (average) signal output of the common output lines Pix⁻out1 and Pix⁻out3 can be obtained.

The switch transistors MX1, MX2, and MX3 are the switches inserted to solve the problem of the addition of the floating capacitances as mentioned above. (The switch transistors MX1, MX2, and MX3 construct the individual signal output circuit (non-adder circuit) which outputs the pixel signals without adding them.) When the signal adder circuit operates, the switch transistors MX1, MX2, and MX3 are turned off, thereby eliminating the floating capacitances regarding nodes a, b, and c. At the time of non-adding, the switch transistors MA1, MA2, and MA3 are turned off, thereby eliminating the influence of the signal adder circuit. An adding/non-adding switching signal which is supplied to the switch transistors MX1, MX2, and MX3 and the switch transistors MA1, MA2, and MA3 can be formed by a timing generator in the sensor or can be also generated from a camera system or a video system. Generally, it is preferable that the mode switching signal is transmitted from the camera system or the video system through a communication terminal and the sensor is controlled directly or through the timing generator. The gains can be switched by, for example, the user by a change-over switch or the like. The still camera shown in FIG. 12 will now be described as an example. A gain switching instruction signal is sent to a control unit 309 for controlling whole and arithmetic operation by the change-over switch (not shown). The adding/non-adding switching signal is transmitted from a timing generator 308 to the switch transistors MX1, MX2, and MX3 and the switch transistors MA1, MA2, and MA3 of the solid-state image pickup device.

Reference numeral 3 denotes the reading circuit. The output of the signal adder circuit 2 and/or the individual signal outputs upon non-adding are temporarily stored into capacitors C0, C1, C2, and C3 through switch transistors MR0 to MR3, respectively. Switch transistors MR4 to MR7 are selected in the scanning order of the scan circuit 4. Those output signals are sequentially outputted through the output amplifier 5.

Figure 2:
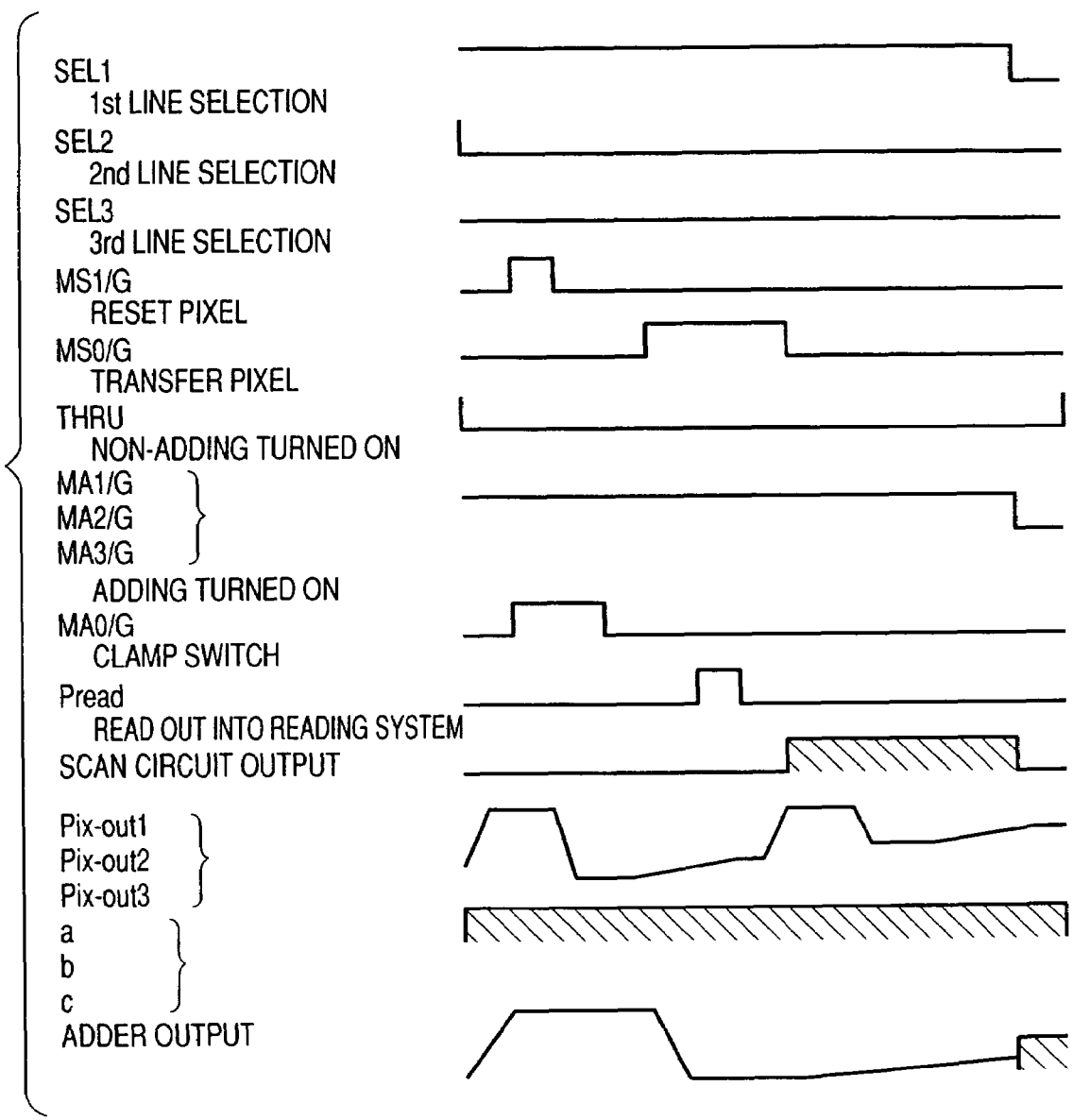
FIG. 2 is a diagram showing the drive timing in the case where a signal adder circuit is validated.

FIG. 2 is a diagram showing the drive timing in the case where the signal adder circuit is validated. The signal SEL1 is set to the high level, thereby turning on the switch transistor MS3 of the first row of the pixel and the switch transistors MA1, MA2, and MA3. In this state, the switch transistor MS1 is turned on, an FD (floating diffusion) portion in the pixel is fixed to a pixel resetting potential Vres, and at the same time, the clamp circuit is turned on (the switch transistor MA0 is turned on). A common node (addition output) of the clamp capacitors CA1, CA2, and CA3 is connected to the electric potential VCL. Thus, the pixel outputs (fixed pattern noises) after the resetting are outputted to the clamp capacitors CA1, CA2, and CA3 and an initial state (the state where the fixed pattern noises of the pixels are held in the clamp capacitors CA1, CA2, and CA3) is held. Subsequently, in the state where the switch transistors MS1 and MA0 are turned off, the transistor MS0 of the first row of the pixel is turned on and the charges accumulated in the photodiode D1 in the pixel are transferred to the FD portion. The pixel outputs corresponding to the transferred charges are outputted to one terminal of each of the clamp capacitors CA1, CA2, and CA3 (the potential change at this time corresponds to an electric potential obtained by subtracting the fixed pattern noises from the pixel outputs). An addition (average) output of the signals from the pixels from which noise has been reduced appears at the other common terminals of the clamp capacitors CA1, CA2, and CA3. By setting a signal Pread to the high level, the addition output result is written into the capacitor C0 through the switch transistor MR0. After that, the scan circuit 4 scans a hatched interval in FIG. 2 and the data of the column of the capacitor C0 is read out from the output amplifier 5.

At this time, the switch transistors MA1, MA2, and MA3 as addition input switches are ON, a signal THRU is at the low level, and the switch transistors MX1 to MX3 are OFF.

Figure 3:
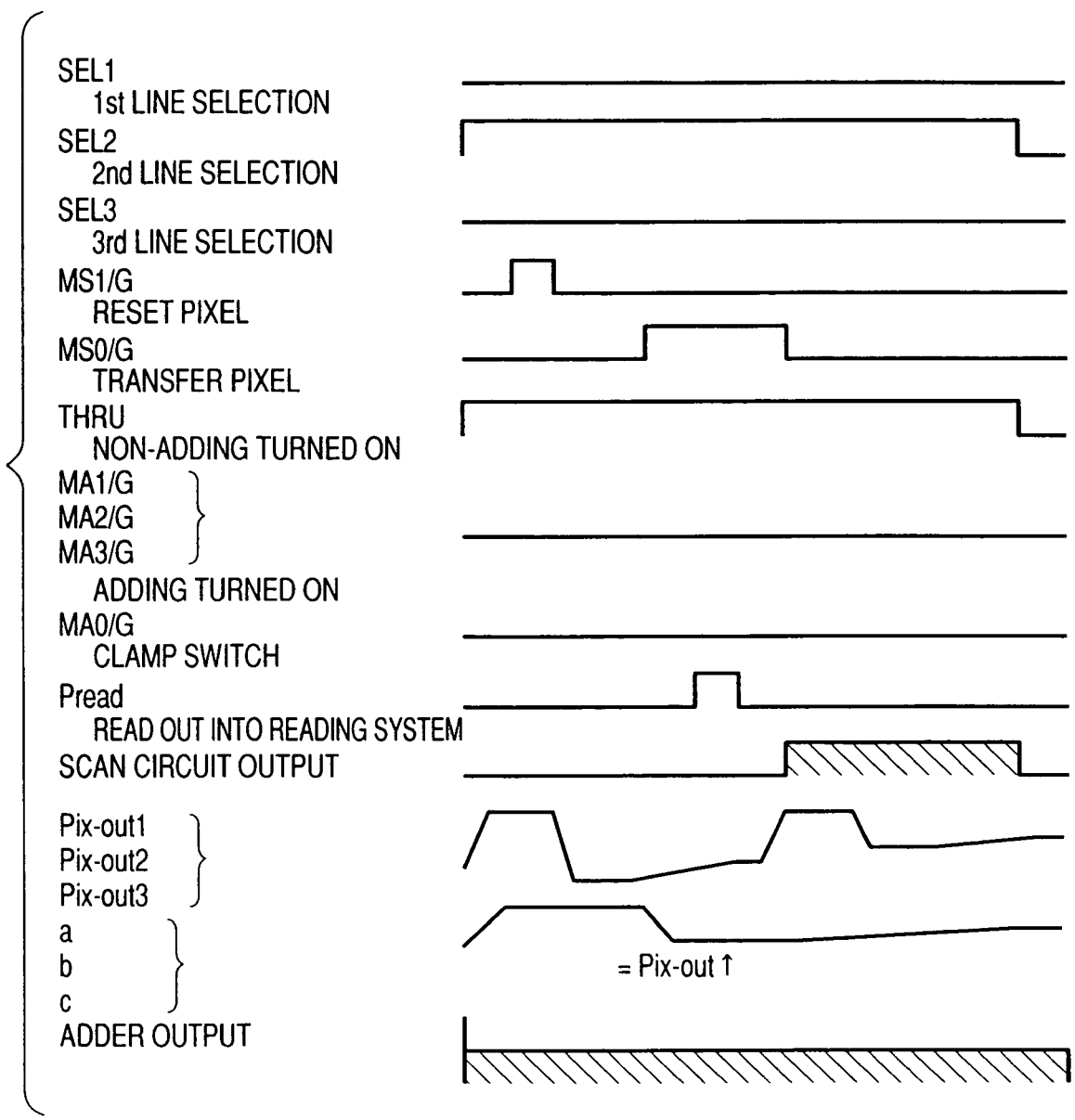
FIG. 3 is a diagram showing the timing of a non-adding state.

In FIGS. 2 and 3, since the switches are OFF for a period of time shown by x, the unstable state is shown.

FIG. 3 is a diagram showing timing of a non-adding state.

Since the signal adder circuit does not operate, the switch transistor MA0 is OFF, the switch transistors MA1, MA2, and MA3 as addition input switches are OFF, and a terminal of the signal THRU is at the high level, and the switch transistors MX1 to MX3 are ON. The reason why the pixel selection signal SEL2 in FIG. 3 is at the high level is because the row different from that in the case of FIG. 2 has been selected. Timing for the switch transistor MS1 of the pixel operation and that for the signal Pread are the same.

The switch transistor MS3 of the second row of the pixel is turned on by setting the signal SEL2 to the high level and the switch transistors MX1 to MX3 are turned on by setting the signal THRU to the high level. In this state, the switch transistor MS1 is turned on. The FD (floating diffusion) portion in the pixel is fixed to the pixel resetting potential Vres. Subsequently, the transistor MS0 of the second row of the pixel is turned on in the state where the switch transistor MS1 is OFF, thereby transferring the charges accumulated in the photodiode D1 in the pixel to the FD portion. By setting the signal Pread to the high level, the pixel outputs corresponding to the accumulated charges are written into the capacitors C1 to C3, respectively. After that, the scan circuit 4 scans a hatched interval in FIG. 3 and the data in the capacitors C1 to C3 is read out from the output amplifier 5.

At this time, the switch transistors MA1, MA2, and MA3 as addition input switches are OFF, the signal THRU is at the high level, and the switch transistors MX1 to MX3 are ON.

Second Embodiment

Figure 4:
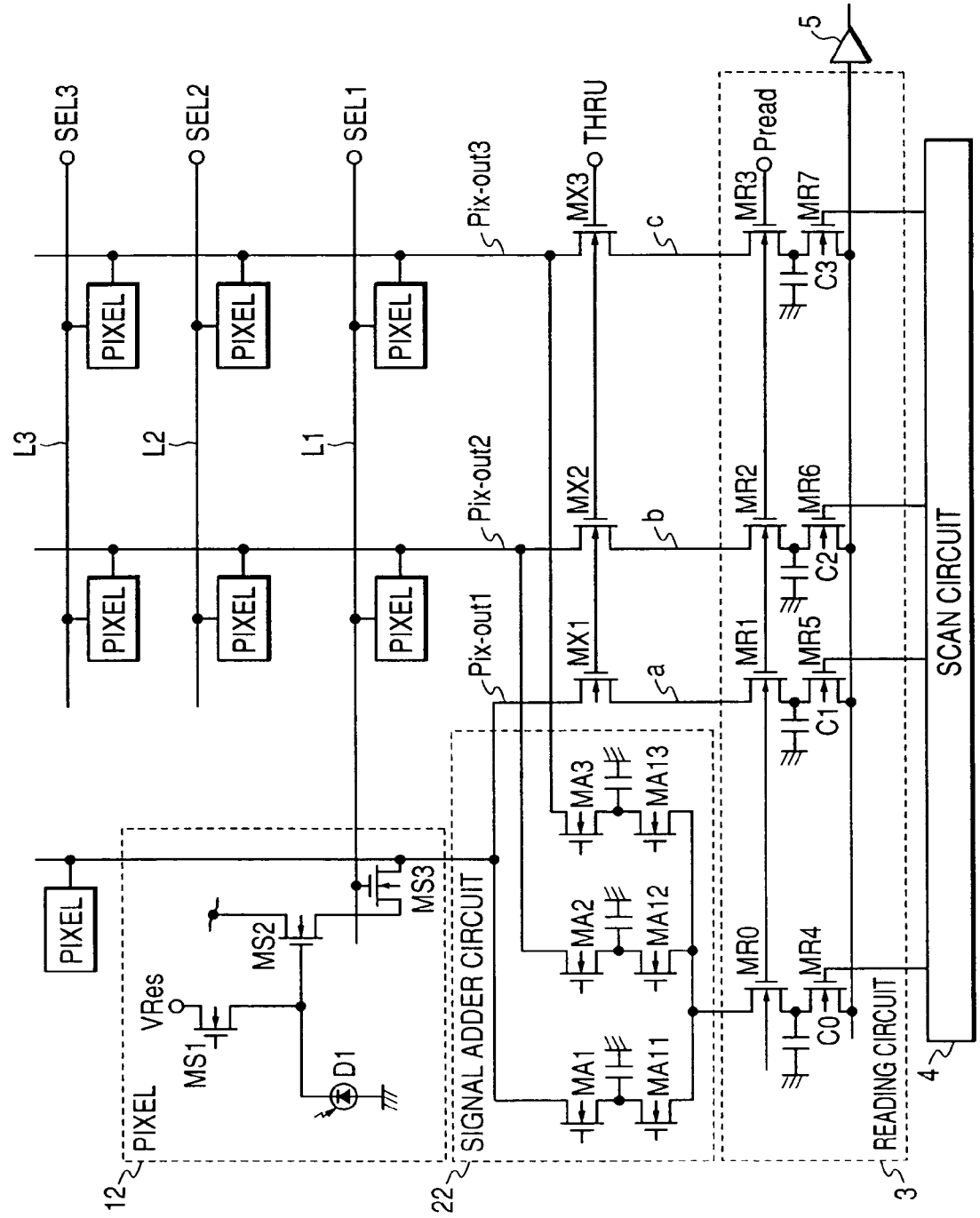
FIG. 4 is a circuit diagram showing a partial construction of a solid-state image pickup device according to the second embodiment of the invention.

FIG. 4 is a circuit diagram showing a partial construction of a solid-state image pickup device according to the second embodiment of the invention.

Although its fundamental construction and the operation are similar to those in the first embodiment, the second embodiment differs from the first embodiment with respect to a point that a pixel 12 does not transfer the signal and a signal adder circuit 22 executes an adding (averaging) process by using a capacitance division.

The pixel 12 is constructed by the photodiode D1 and the MOS transistors MS1, MS2, and MS3. As compared with the pixel 1 in FIG. 1, the MOS transistor MS0 is deleted and the signal charges from the photodiode D1 are sent to the gate portion of the output transistor MS2 and its floating capacitor (FD).

The signal adder circuit 22 is constructed by: the switch transistors MA1 to MA3; three capacitors which are connected to the common output lines Pix⁻out1, Pix⁻out2, and Pix⁻out3 through the switch transistors MA1 to MA3, respectively; and switch transistors MA11 to MA13 which are connected to the three capacitors and serially connected to the switch transistors MA1 to MA3, respectively. Signals held in the three capacitors are added by turning on the switch transistors MA11 to MA13.

Also in the second embodiment, the floating capacitance existing in the output lines is eliminated and suppressed by distinguishing the addition from the non-addition (individual signal output) in a manner similar to the first embodiment.

Third Embodiment

Figure 5:
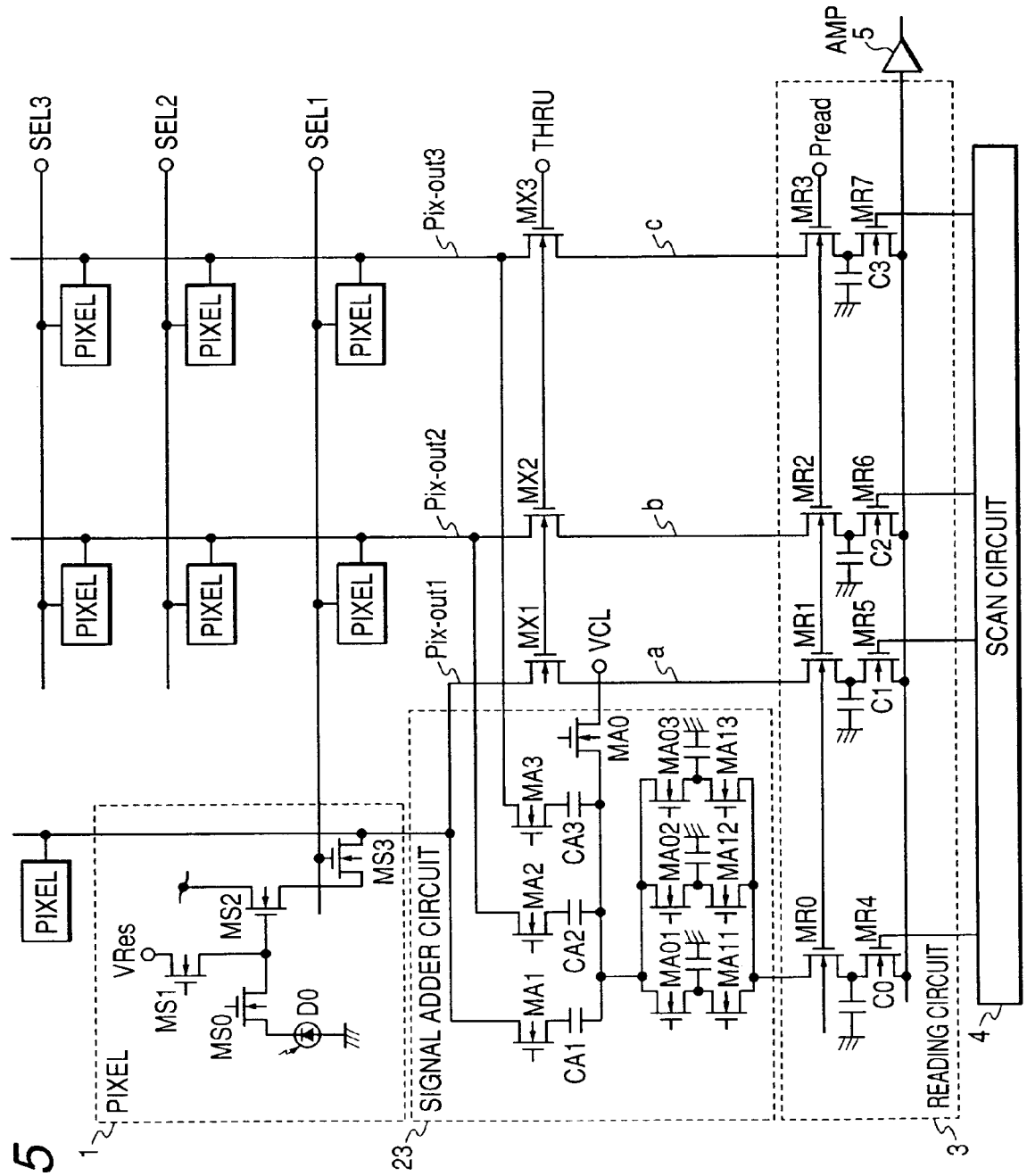
FIG. 5 is a circuit diagram showing a partial construction of a solid-state image pickup device according to the third embodiment of the invention.

FIG. 5 is a circuit diagram showing a partial construction of a solid-state image pickup device according to the third embodiment of the invention.

Although its fundamental construction and the operation are similar to those in the first embodiment, the third embodiment differs from the first embodiment with respect to a point that after a signal adder circuit 23 executes addition (averaging) by using a capacitance division after the clamping. Since the signal addition in the row (horizontal) direction can be executed by a clamp circuit and the signal addition in the column (vertical) direction can be executed by a sampling and holding (S/H) circuit, a two-dimensional signal addition result can be obtained.

In the signal adder circuit 23, one terminal of the clamp capacitor CA1 is connected to the common output line Pix⁻ out1 through the switch transistor MA1, one terminal of the clamp capacitor CA2 is connected to the common output line Pix⁻out2 through the switch transistor MA2, one terminal of the clamp capacitor CA3 is connected to the common output line Pix⁻out3 through the switch transistor MA3, and the other terminals of the clamp capacitors CA1, CA2, and CA3 are connected in common to switch transistors MA01 to MA03.

The switch transistors MA01 to MA03 are connected to the three capacitors, respectively. The switch transistors MA11 to MA13, which are respectively connected to the three capacitors and serially connected to the switch transistors MA1 to MA3, are connected to the switch transistor MR0 of the reading circuit 3.

The signal addition output of the signals from the pixels from which the noise has been reduced appears at the other common terminals of the clamp capacitors CA1, CA2, and CA3. For example, when the signals from the pixels of the first row are outputted to the common output lines Pix⁻out1, Pix⁻out2, and Pix⁻out3, by turning on the switch transistors MA1 to MA3, the pixel signal outputs from the pixels from which the noises have been reduced are added. By turning on the switch transistor MA01, the addition signal output of the pixels of the first row is held in the first capacitor. Subsequently, when the signals from the pixels of the second row are outputted to the common output lines Pix⁻out1, Pix⁻out2, and Pix⁻out3, by turning on the switch transistors MA1 to MA3, the pixel signal outputs from the pixels from which the noise has been reduced are added. By turning on the switch transistor MA02, the addition signal output of the pixels of the second row is held in the second capacitor. Subsequently, by similarly turning on the switch transistor MA03, the addition signal output of the pixels of the third row is held in the third capacitor. By turning on the switch transistors MA11 to MA13, the signals held in the first to third capacitors are added.

In this manner, the pixel signal outputs of the pixels of 3×3 of the first to third rows and the first to third columns can be added and outputted.

By properly controlling the switch transistors (MA1, MA2, MA3), (MA01, MA02, MA03), and (MA11, MA12, MA13), it is possible to arbitrarily execute the signal addition in the vertical direction, the signal addition in the horizontal direction, the signal addition in the oblique direction, or the addition based on a combination of them.

Also in the third embodiment, the floating capacitance existing in the output lines is eliminated and suppressed by distinguishing the signal addition from the signal non-addition (individual signal output) in the pixel signal output.

Fourth Embodiment

Figure 6:
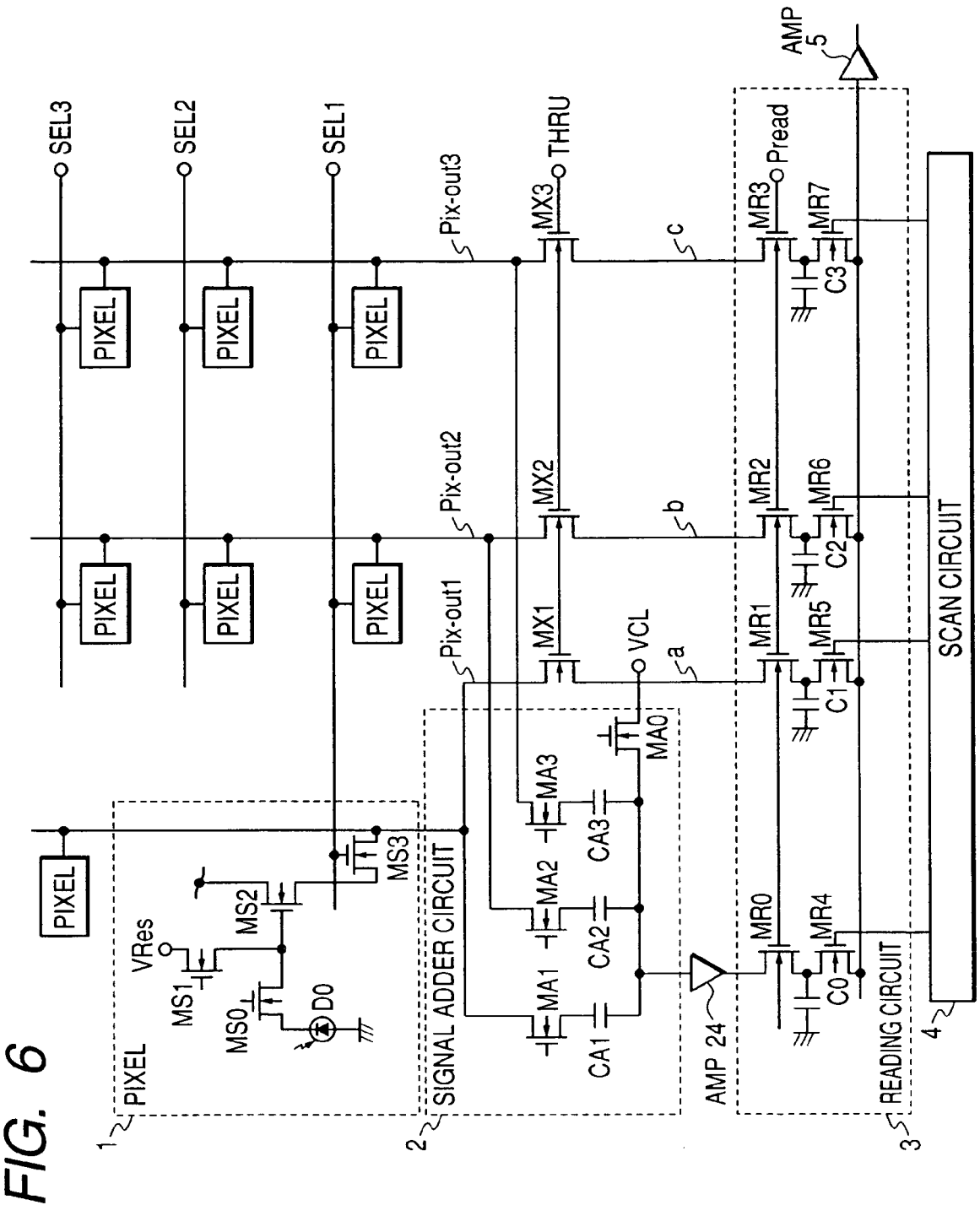
FIG. 6 is a circuit diagram showing a partial construction of a solid-state image pickup device according to the fourth embodiment of the invention.

FIG. 6 is a circuit diagram showing a partial construction of a solid-state image pickup device according to the fourth embodiment of the invention.

Although its fundamental construction is similar to that in the first embodiment, the fourth embodiment differs from the first embodiment with respect to a point that an output of the signal adder circuit 2 is received by an amplifier 24. Since the output itself of the clamp circuit has a high impedance, its driving ability is low. If the signal is propagated to the capacitor C0, the capacitance is divided and an output level decreases. Therefore, impedance conversion means like an amplifier 24 is used. Also in the fourth embodiment, the floating capacitance existing in the output lines is eliminated and suppressed by distinguishing the signal addition from the signal non-addition (individual signal output).

Fifth Embodiment

Figure 11:
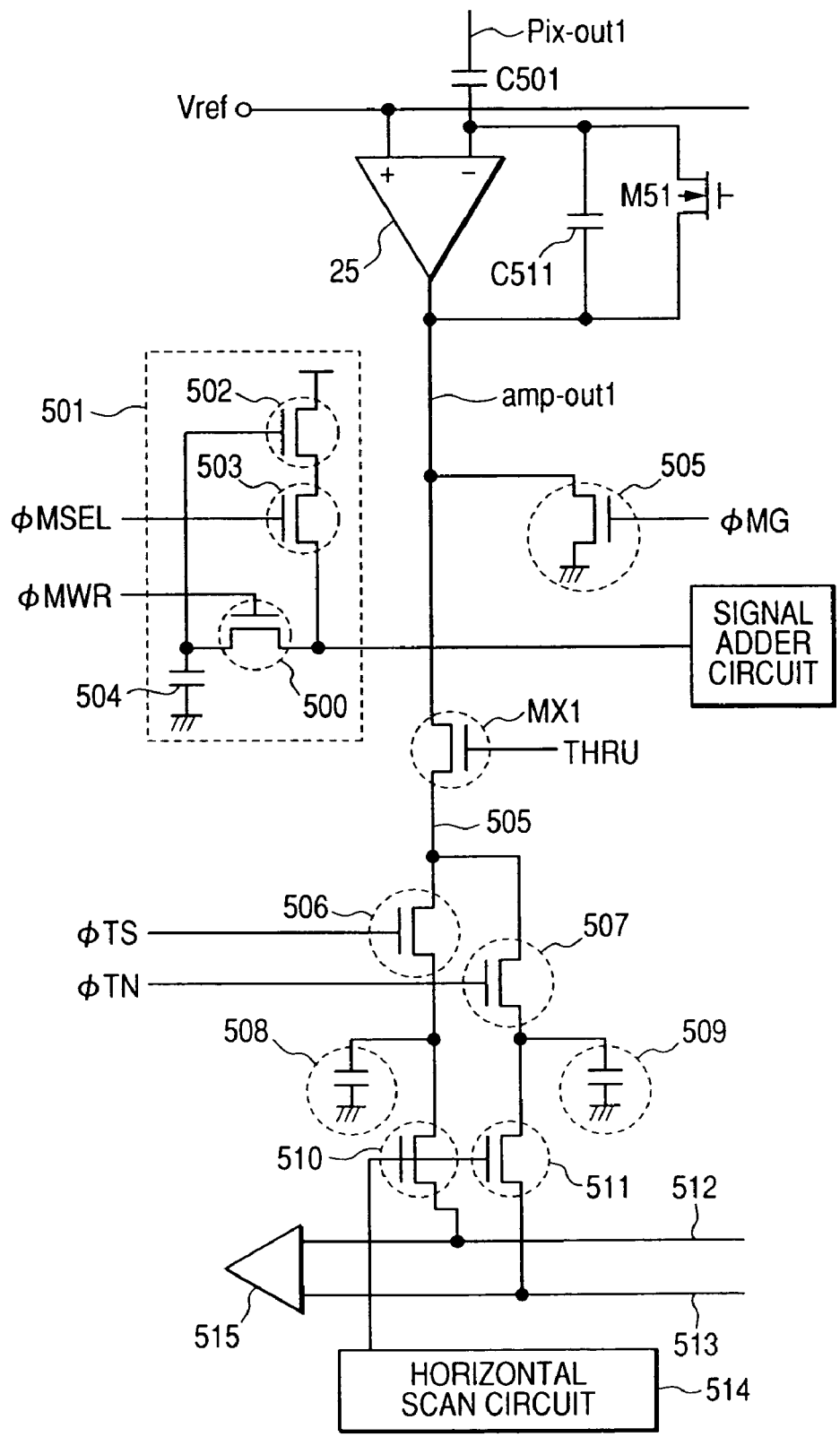
FIG. 11 is a circuit diagram showing a partial construction of a solid-state image pickup device according to the fifth embodiment of the invention.

FIG. 11 is a circuit diagram showing a partial construction of a solid-state image pickup device according to the fifth embodiment of the invention. Although one memory cell and reading means of one column are shown for simplicity of explanation, actually, the memory cells corresponding to the number of pixels are two-dimensionally arranged to thereby form a memory unit and the reading means is provided for each column. The number of pixels and the number of memory cells are set as necessary. It is possible to set the number of memory cells to be smaller than the number of pixels. For example, in the case of adding or decimating the signals from a plurality of pixels and storing into the memory cells, the number of memory cells can be smaller than the number of pixels.

In FIG. 11, the inverting input terminal (−) of the operational amplifier 25 is connected to the capacitor C501 serving as a coupling capacitor as a clamp capacitor and the operational amplifier 25 amplifies the clamp signal of the pixel. The operational amplifier 25 is a feedback type amplifier and its output is fed back to the negative input terminal (−) through the capacitor C511. Therefore, the gain of the operational amplifier 25 is determined by a capacitance ratio of the capacitors C501 and C511. The positive input terminal (+) of the operational amplifier 25 is fixed to the clamp potential Vref. The negative input terminal (−) is clamped to the clamp potential Vref by turning on the switch transistor M51 by applying a pulse φC thereto. This is because the input terminal of the operational amplifier is in an imaginary short state.

As for the clamping operation of the capacitor C501, by turning on the switch transistor M51, the input terminal of the capacitor C501 on the side of the inverting input terminal (−) of the operational amplifier 25 is set to the clamp potential Vref. In this state, a gate electrode of the amplifying transistor MS2 of the pixel shown in FIG. 1 is reset to a predetermined electric potential by the resetting transistor MS1. After that, the switch transistor M51 is turned off and the input terminal of the capacitor C501 on the side of the inverting input terminal (−) of the operational amplifier 25 is set into the floating state. In the pixel, the photosignal is sent from the photodiode D1 to the gate electrode of the amplifying transistor MS2 through the charge transfer transistor MS0. The amplified signal is inputted from the pixel into the capacitor C501. An electric potential change amount of the input side terminal of the capacitor C501 is equal to an amount by which the noise components have been reduced from the signal. The noise-reduced signal is inputted from the pixel to the operational amplifier 25.

The signal amplified by the operational amplifier 25 is written into a memory cell 501. The memory cell 501 is constructed by: an amplifying transistor 502; a memory selecting transistor 503; a writing transistor 500; and a memory cell capacitor 504. A current supplying transistor 505 supplies a current so that the amplifying transistor 502 functions as a source-follower. Although the amplifying frame memory is used in the embodiment, a DRAM type memory constructed by the writing transistor (also functions as a reading transistor) 500 and the memory cell capacitor 504 can be also used. By using the amplifying memory, upon reading the signal from the memory to the storage capacitor, a decrease in signal voltage is not caused owing to the amplifying function of the memory cell 501.

The signal is read out of the memory cell 501 by turning on the memory selecting transistor 503 and the switch transistor MX1. The output of the selected memory cell is sampled and held into a storage capacitor 508 by turning on a switch transistor 506 by a pulse φTS. Subsequently, the inverting input terminal and the output terminal of the operational amplifiers 25 are short-circuited by turning on the switch transistor M51 and an offset output of the operational amplifiers 25 is written into the memory cell 501. The reading and the sampling of the offset output written in the memory cell are similar to those of the signal written in the memory cell. The sampling of the offset output from the memory cell into a storage capacitor 509 is executed by applying a pulse φTN to a switch transistor 507. A voltage on the storage capacitor 508 includes an offset of the amplifying transistor 502 in addition to the amplified pixel signal and the offset of the operational amplifier 25. A voltage on the storage capacitor 509 includes the offset of the amplifying transistor 502 in addition to the offset of the operational amplifier 25.

Subsequent to the above operation, a horizontal scan is performed by a horizontal scan circuit 514. The horizontal scan circuit 514 scans transistors 510 and 511 as a switch pair and transfers voltages on the storage capacitors 508 and 509 to horizontal output lines 512 and 513, respectively. A differential amplifier 515 eliminates the offsets of the operational amplifiers 25 and the amplifying transistor 502 and outputs a sensor signal having a high S/N ratio.

Figure 8:
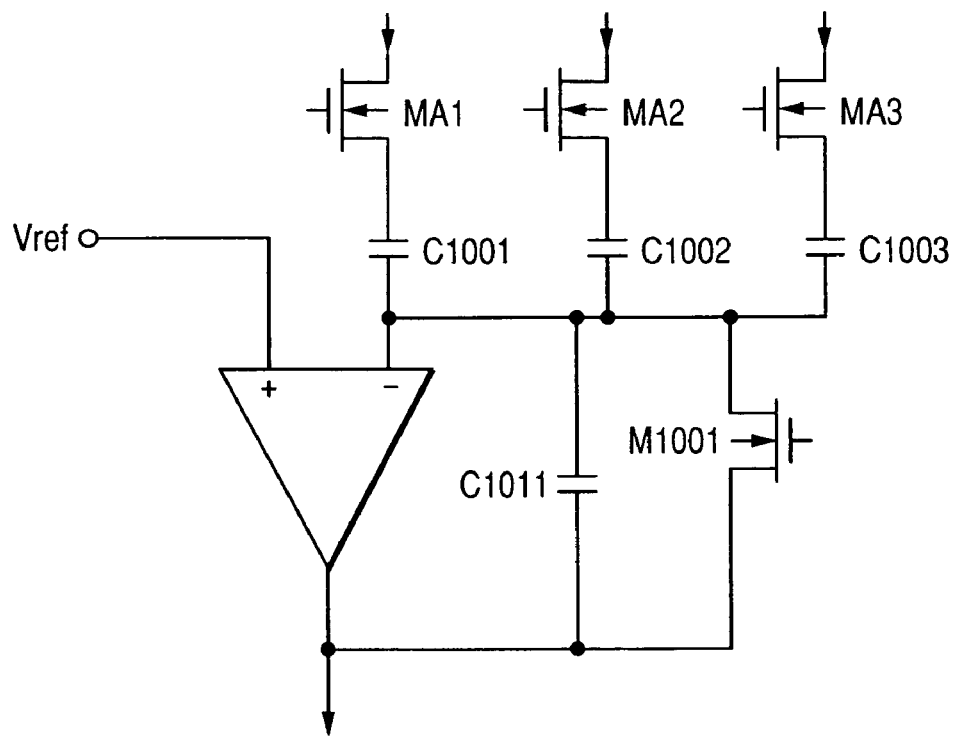
FIG. 8 is a diagram showing an adder using an operational amplifier.
Figure 9:
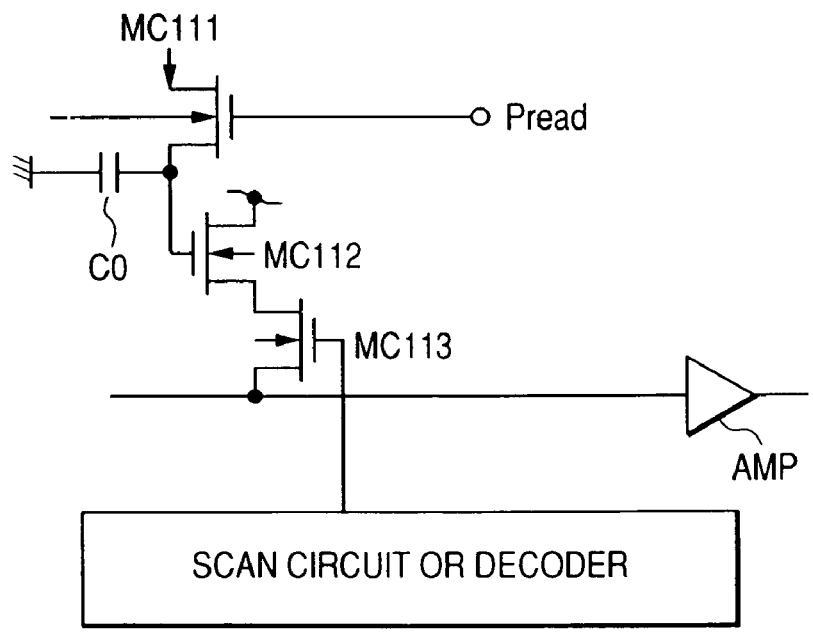
FIG. 9 is a diagram showing a reading circuit using a source-follower.

The signal adder circuit and the reading circuit in each of the embodiments described above are merely shown as an example. Naturally, the effects of the invention can be also obtained by using an adder (FIG. 8) using an operational amplifier, a reading system (FIG. 9) using a source-follower, and the like. In FIG. 8, the switch transistors MA1 to MA3 are connected in common to the inverting input terminal of the operational amplifier through capacitors C1001 to C1003. C1011 denotes a capacitor provided between the output terminal and the inverting input terminal of the operational amplifier. M1001 denotes a switch transistor connected in parallel to the capacitor C1011. A reference voltage (Vref) is applied to the non-inverting input terminal of the operational amplifier. In FIG. 9, the source-follower is constructed by MOS transistors MC112 and MC113.

Although the solid-state image pickup device can be provided on the same semiconductor substrate in each of the above embodiments, the differential amplifier 515 can be also provided on the outside of the substrate so that the noises caused by the differential amplifier 515 do not exert an influence on other circuit members.

In each of the above embodiments, when attention is paid to one vertical output line, two MOS transistors MA1 and MX1 are merely connected and the load (floating capacitance) of the output can be reduced.

An embodiment in the case (image pickup system) where the solid-state image pickup device according to the invention is applied to a still camera corresponding to a motion image will now be described in detail with reference to FIG. 12.

Figure 12:
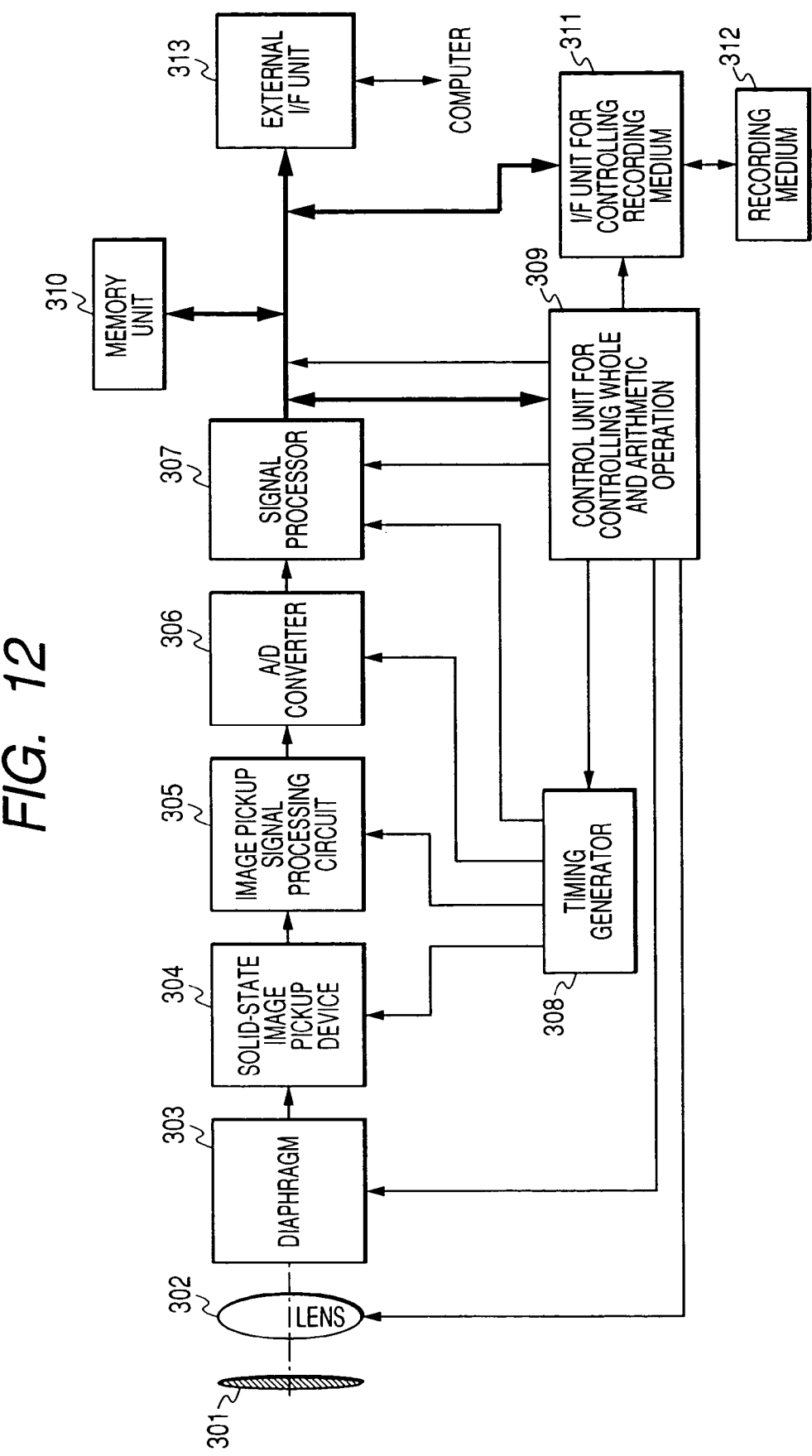
FIG. 12 is a block diagram showing the case where the solid-state image pickup device according to the invention is applied to a "still video camera"

FIG. 12 is a block diagram showing the case where the solid-state image pickup device according to the invention is applied to a "still video camera" corresponding to a motion image.

In FIG. 12, reference numeral 301 denotes a barrier which protects a lens and also functions as a main switch; reference numeral 302 denotes a lens for forming an optical image of an object onto a solid-state image pickup device 304; reference numeral 303 denotes a diaphragm for varying an amount of light passing through the lens 302; reference numeral 304 denotes the solid-state image pickup device for fetching the object image formed by the lens 302 as an image signal; reference numeral 306 denotes an A/D converter for converting the analog image signal outputted from the solid-state image pickup device 304 into a digital signal; reference numeral 307 denotes a signal processor for executing various correcting processes to image data outputted from the A/D converter 306 and compressing the data; reference numeral 308 denotes the timing generator for generating various timing signals to the image pickup device 304, an image pickup signal processing circuit 305, the A/D converter 306, and the signal processor 307; reference numeral 309 denotes the control unit for controlling various arithmetic operations and the whole still video camera; reference numeral 310 denotes a memory unit for temporarily storing the image data; reference numeral 311 denotes an interface (I/F) unit for recording or reading out the image data onto/from a recording medium; reference numeral 312 denotes a detachable recording medium such as a semiconductor memory or the like for recording or reading out the image data; and reference numeral 313 denotes an interface unit for communicating with an external computer or the like.

The operation of the still video camera upon photographing in the above construction will now be described.

When the barrier 301 is opened, a main power source is turned on, a power source of a control system is turned on, and a power source of image pickup system circuits, such as an A/D converter 306 and the like, is turned on.

The control unit 309 for controlling the whole and arithmetic operations opens the diaphragm 303 in order to control an exposure light amount. After the signal outputted from the image pickup device 304 is converted into the digital signal by the A/D converter 306, it is inputted to the signal processor 307. On the basis of the inputted data, data representing the exposure is arithmetically operated on by the control unit 309 for controlling the whole and arithmetic operations.

Brightness is discriminated on the basis of the photometric results. The control unit 309 for controlling the whole and arithmetic operations controls the diaphragm in accordance with a discrimination result.

On the basis of the signal outputted from the image pickup device 304, high frequency components are extracted and data representing the distance to the object is arithmetically on operated by the control unit 309 for controlling the whole and arithmetic operations. After that, the lens is driven and whether or not the lens has been in-focused is discriminated. If it is determined that the lens is not in-focused, the lens is driven again and the distance is measured. After the in-focused state is confirmed, the exposure is started.

After the exposure is finished, the image signal outputted from the image pickup device 304 is A/D converted into the digital signal by the A/D converter 306. The digital signal passes through the signal processor 307 and is written into the memory unit 310 by the control unit 309 for controlling the whole and arithmetic operations.

After that, the data stored in the memory unit 310 passes through the recording medium I/F unit 311 for recording or reading out the image data and is recorded onto the detachable recording medium 312 such as a semiconductor memory or the like.

It is also possible to directly input the image signal to a computer or the like through the external I/F unit 313 and process the image.

An example in the case (image pickup system) of applying the solid-state image pickup device of the invention to the video camera will now be described with reference to FIG. 13.

Figure 13:
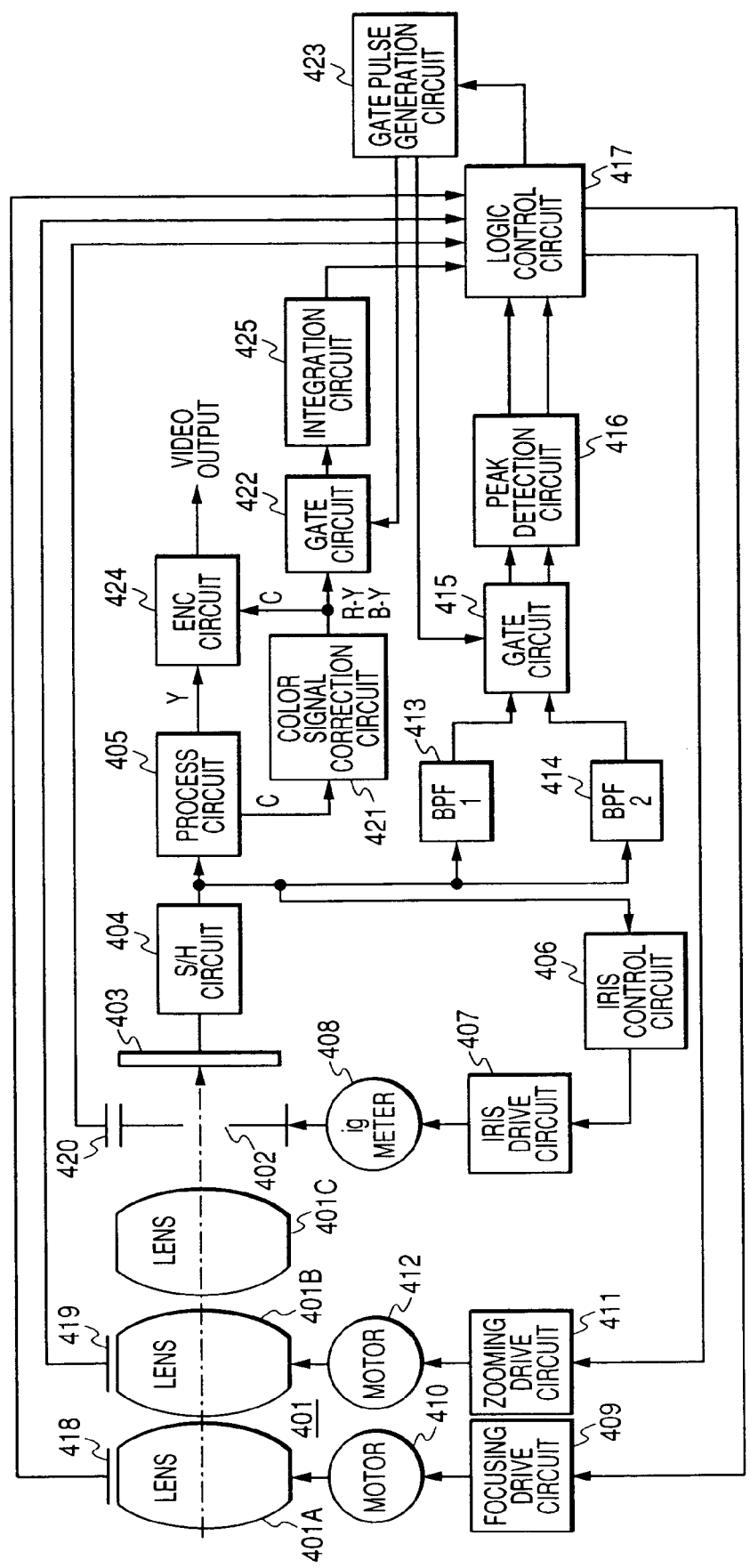
FIG. 13 is a block diagram showing the case where the solid-state image pickup device according to the invention is applied to a video camera.
Figure 14:
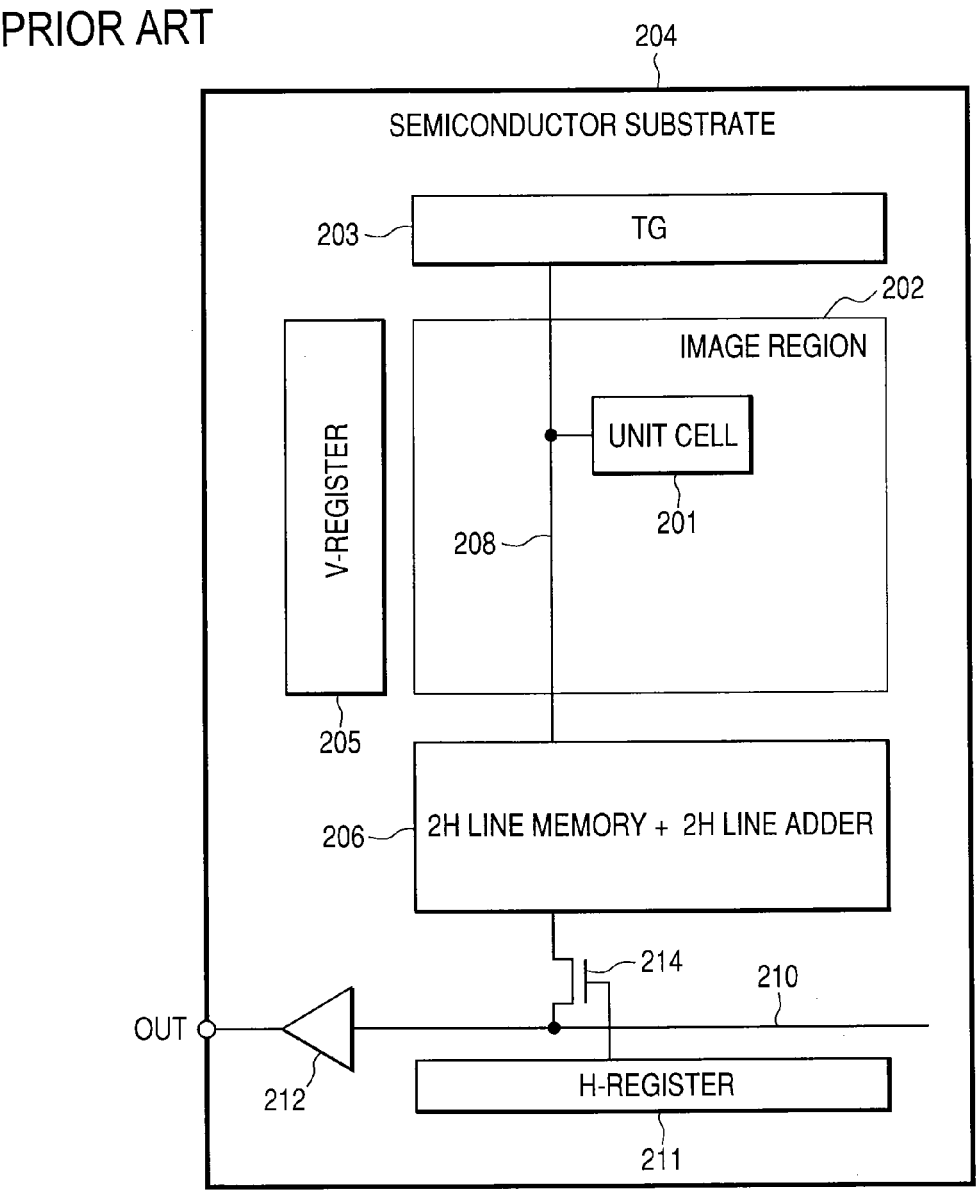
FIG. 14 is a block diagram showing a construction of a conventional solid-state image pickup device.
Figure 15:
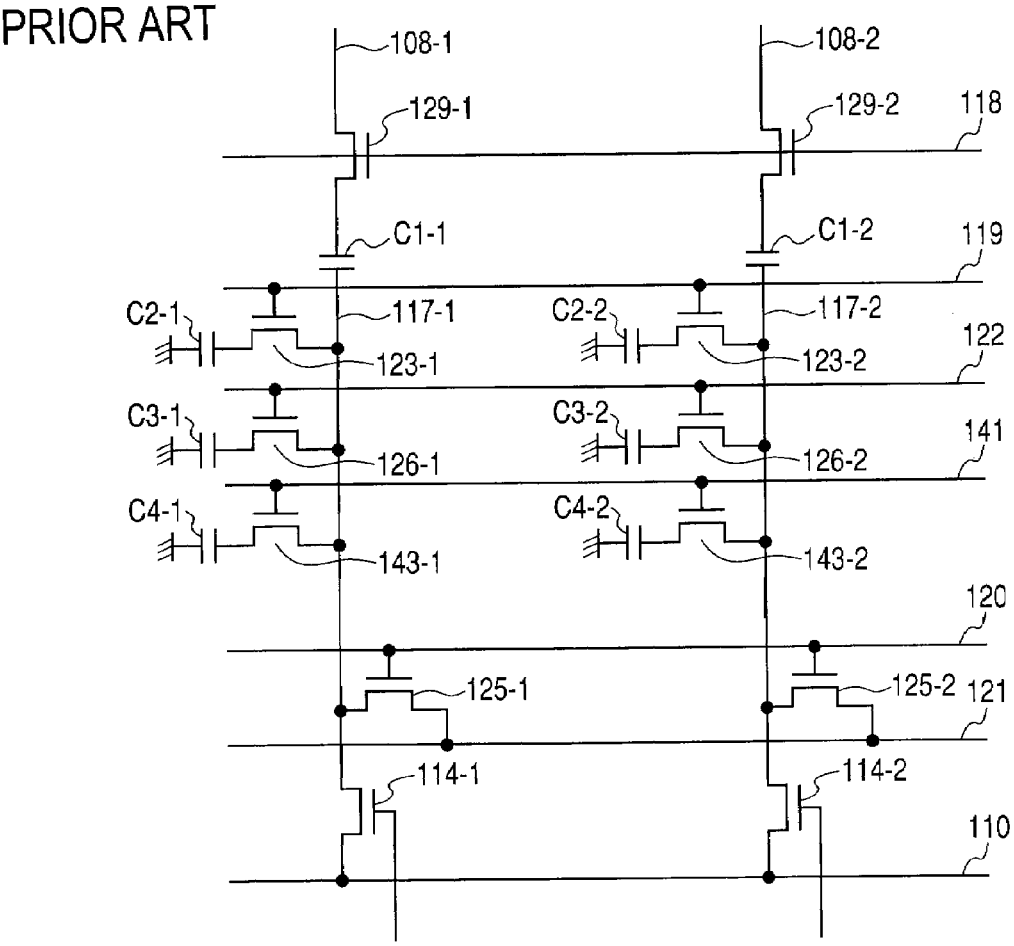
FIG. 15 is a circuit diagram showing a construction of an adder of the conventional solid-state image pickup device.

FIG. 13 is a block diagram showing the case where the solid-state image pickup device according to the invention is applied to the video camera. Reference numeral 401 denotes a photographing lens having: a focusing lens 401A makes a focal point adjustment; a zooming lens 401B executes the zooming operation; and an image forming lens 401C.

Reference numeral 402 denotes a diaphragm; reference numeral 403 denotes a solid-state image pickup device for photoelectrically converting an object image formed on the image pickup plane into an electric image pickup signal; and reference numeral 404 denotes a sampling and holding (S/H) circuit for sampling and holding the image pickup signal outputted from the solid-state image pickup device 403, further, amplifying its level, and outputting a video signal.

Reference numeral 405 denotes a processing circuit for executing predetermined processes such as gamma correction, color separation, a blanking process, and the like on the video signal outputted from the S/H circuit 404 and outputting a luminance signal Y and a chroma signal C. The chroma signal C outputted from the processing circuit 405 is subjected to correction of a white balance and a color balance by a chrominance signal correction circuit 421, so that color difference signals R-Y and B-Y are outputted.

The luminance signal Y outputted from the processing circuit 405 and the color difference signals R-Y and B-Y outputted from the chrominance signal correction circuit 421 are modulated by an encoder (ENC) circuit 424, so that a standard television signal is outputted. The standard TV signal is supplied to a video recorder (not shown) or a monitor EVF such as an electronic viewfinder or the like.

Reference numeral 406 denotes an iris control circuit for controlling an iris drive circuit 407 on the basis of the video signal supplied from the S/H circuit 404 and automatically controlling an ig meter 408 so as to control an aperture amount of the diaphragm 402 so that the level of the video signal is equal to a predetermined value of a predetermined level. Reference numerals 413 and 414 denote band pass filters (BPFs) having different pass bands for extracting high frequency components necessary to perform in-focus detection from the video signal outputted from the S/H circuit 404. Signals outputted from the first band pass filter 413 (BPF 1) and the second band pass filter 414 (BPF 2) are gated by a gate circuit 415 and a focusing gate frame signal. A peak value is detected and held by a peak detection circuit 416 and inputted to a logic control circuit 417.

Such a signal is called a focal point voltage. The focusing is made by the focal point voltage.

Reference numeral 418 denotes a focusing encoder for detecting a moving position of the focusing lens 401A; reference numeral 419 denotes a zooming encoder for detecting a focal point distance of the zooming lens 401B; and reference numeral 420 denotes an iris encoder for detecting the aperture amount of the diaphragm 402. Detection values of those encoders are supplied to the logic control circuit 417 for controlling the whole system. The logic control circuit 417 performs a focal point detection to the object on the basis of the video signal corresponding to an area in the set focal point detection region, thereby making the focal point adjustment. That is, the peak value information of the high frequency components supplied from the BPFs 413 and 414 is fetched, control signals regarding a rotating direction, a rotational speed, a rotation/stop, and the like of a focusing motor 410 are supplied to a focusing drive circuit 409 so as to drive the focusing lens 401A to a position where the peak value of the high frequency components becomes the maximum, and they are controlled.

The invention is applied to a solid-state image pickup device having one-dimensional or two-dimensional pixel signal adder means and preferably used for a digital camera (still camera), a digital video camera, or the like corresponding to a motion image.

This application claims priority from Japanese Patent Application No. 2004-164636 filed on Jun. 2, 2004, which is hereby incorporated by reference herein.

What is claimed is:

1. A solid-state image pickup device comprising:
a plurality of pixels which are one-dimensionally or two-dimensionally arranged and output photoelectrically converted signals;
a plurality of output lines to which the output signals from the pixels are outputted;
a plurality of amplifiers connected to said plurality of output lines, respectively, configured to amplify the output signals from the pixels with a gain exceeding 1;
an adder circuit having a plurality of first switches configured to select output signals from the plurality of amplifiers, and output added selected output signals;
an output circuit having a plurality of second switches each having one terminal connected to an output terminal of one of the amplifiers, and outputting output signals from the plurality of amplifiers without adding;
a reading circuit configured to read out signals outputted from the adder circuit and the output circuit; and
an output amplifier configured to output signals read out by the reading circuit,
wherein the adder circuit further comprises a plurality of storage capacitors each having one terminal connected to each of the first switches, wherein the other terminals of the storage capacitors are connected commonly,
wherein the reading circuit further comprises a third switch connected between the storage capacitors and the output amplifier, and a fourth switch connected between the other terminal of the second switch and the output amplifier, and
wherein the second switch is turned off while said adder circuit outputs added signals, and the first switch is turned off while said output circuit outputs output signals from the plurality of amplifiers without adding.

2. A device according to claim 1, further comprising an impedance converting device arranged at a stage after the adder circuit.

3. A device according to claim 1,
wherein the reading circuit further comprises a first capacitor connected to the third switch and holding the signal from the adder circuit, and a fifth switch connected between the first capacitor and the output amplifier.

4. A device according to claim 1,
wherein the adder circuit further comprises an operation amplifier having an input terminal connected to the other terminals of the storage capacitor and an output terminal connected through a capacitor to the input terminal.

5. A device according to claim 1,
wherein each of said output lines is connected to an amplifier of said plurality of amplifiers through a coupling capacitor configured to reduce noise of a pixel of said plurality of pixels by clamping the signal from said pixel.

6. A device according to claim 4, further comprising a memory unit configured to hold the output signal amplified by said operation amplifier.

7. A device according to claim 6, wherein said memory unit is an amplifying-type memory cell comprising at least a capacitor to which the output signal amplified by said operation amplifier is written, a transistor for writing the output signal amplified by said operation amplifier, and a transistor for amplifying the output signal amplified by said operation amplifier.

8. A device according to claim 7, further comprising circuit means, arranged for every column of said amplifying-type memory cells of said memory unit, for outputting output offsets of said operation amplifier and said amplifying-type memory cells of said memory unit and the signals from said amplifying-type memory cells of said memory unit.

9. A device according to claim 8, wherein said circuit means comprises:
- a first storage capacitor configured to store said output offsets;
- a first transfer transistor configured to transfer said output offsets to said first storage capacitor of said circuit means;
- a second storage capacitor configured to store the signal from said amplifying-type memory cells; and
- a second transfer transistor configured to transfer the signals from said amplifying-type memory cells to said second storage capacitor of said circuit means.

10. A device according to claim 9, further comprising means for executing subtraction between said output offsets and said signals from said circuit means.

11. An image pickup system comprising:
- a solid-state image pickup device according to claim 1; and
- a lens system configured to focus an image on the solid-state image pickup device; and
- a signal processing circuit configured to process an output signal from the solid-state image pickup device.

12. A method for driving a solid-state image pickup device comprising a plurality of pixels which are one-dimensionally or two-dimensionally arranged and output photoelectrically converted signals, a plurality of output lines to which the output signals from the pixels are outputted, a plurality of amplifiers connected to the plurality of output lines, respectively, configured to amplify the output signal from the pixels with a gain exceeding 1, an adder circuit having a plurality of first switches configured to select output signals from the plurality of amplifiers, and output added selected output signals, an output circuit having a plurality of second switches each having one terminal connected to an output terminal of one of the amplifiers, and outputting output signals from the plurality of amplifiers without adding, a reading circuit configured to read out signals outputted from the adder circuit and the output circuit, and an output amplifier configured to output signals read out by the reading circuit, wherein the adder circuit further comprises a plurality of storage capacitors each having one terminal connected to each of the first switches, wherein the other terminals of the storage capacitors are connected commonly, the reading circuit further comprising a third switch connected between the storage capacitors and the output amplifier, and a fourth switch connected between the other terminal of the second switch and the output amplifier, wherein the method comprising steps of:

turning off the second switch while the adder circuit outputs added signals, and turning off the first switch while the output circuit outputs output signals from the plurality of amplifiers without adding.

* * * * *